M. G. NEWMAN.
METHOD OF AND MEANS FOR MEASURING VOLTAGES.
APPLICATION FILED MAR. 1, 1917.
1,254,620.   Patented Jan. 22, 1918.
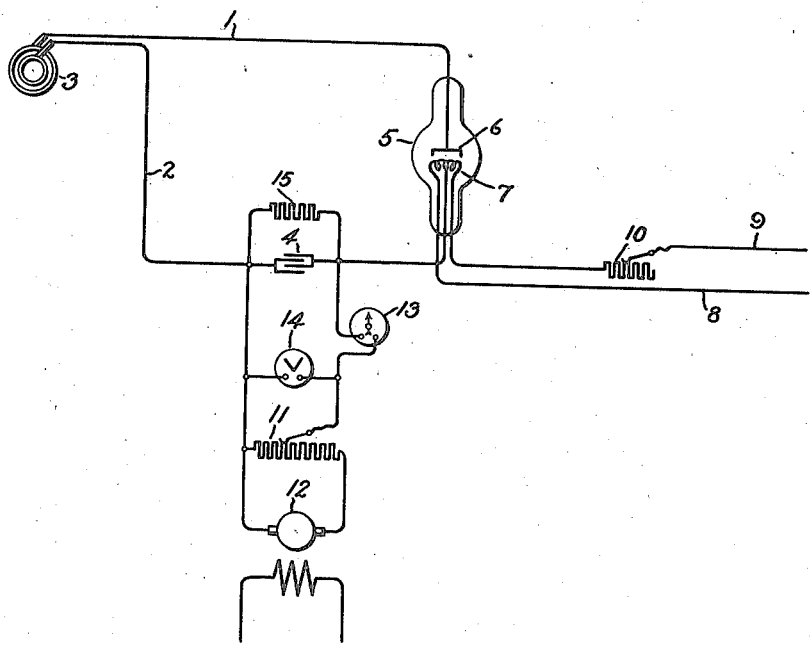
Inventor:
Max G. Newman,
by
His Attorney.

UNITED STATES PATENT OFFICE.

MAX G. NEWMAN, OF LANESBORO, MASSACHUSETTS, ASSIGNOR TO GENERAL ELECTRIC COMPANY, A CORPORATION OF NEW YORK.

METHOD OF AND MEANS FOR MEASURING VOLTAGES.

1,254,620.   Specification of Letters Patent.   Patented Jan. 22, 1918.

Application filed March 1, 1917. Serial No. 151,730.

*To all whom it may concern:*

Be it known that I, MAX G. NEWMAN, a citizen of the United States, residing at Lanesboro, county of Berkshire, State of Massachusetts, have invented certain new and useful Improvements in Methods of and Means for Measuring Voltages, of which the following is a specification.

My present invention relates to electrical measurements and more particularly to the measurement of voltages.

The object of my invention is to provide a convenient and accurate method of and means for measuring the maximum voltage in a circuit supplied by a variable source of potential such, for example, as an alternating current generator.

In carrying my invention into effect I charge a condenser by means of current from the circuit whose potential is to be measured. By supplying current through a device having asymmetric conductivity the condenser is charged to the maximum potential of the supply circuit. A separate adjustable source of direct current is also connected to the condenser in opposition to the charging potential, and so adjusted that a galvanometer in series with the source gives no deflection. This indicates that the direct current potential is equal to the charging potential. A voltage measuring instrument connected to the direct current source will then indicate the value of the potential which it is desired to determine.

The features of my invention which I consider novel are pointed out with particularity in the appended claims. The invention itself, however, both as to its organization and mode of operation will best be understood by reference to the following description taken in connection with the accompanying drawing in which I have indicated diagrammatically one embodiment thereof.

As indicated in the drawing the circuit which comprises the conductors 1 and 2 is supplied with alternating current from the alternator 3. It will of course be understood that the circuit whose maximum potential is to be determined may be supplied by any other variable source of current, such, for example, as the secondary of a transformer.

The condenser 4 is charged from the circuit 1, 2 by means of a unidirectional current supplied by the "kenotron" or hot cathode rectifier 5. This rectifier comprises an anode 6 and a cathode 7 adapted to be heated to incandescence by means of current supplied from the supply conductors 8, 9. The value of the heating current may be regulated by means of the variable resistance 10. If the leakage of the condenser is small enough so that there will be a negligible drop in the kenotron the condenser will be charged to the maximum value of the potential wave in the circuit. The condenser 4 also has connected thereto a source of direct current potential which in the present instance is derived from the potentiometer 11 which is supplied with current by the direct current generator 12. If the potentiometer is adjusted so that the galvanometer 13 indicates that no current is flowing to the condenser the voltage supplied by the potentiometer may be read upon the voltmeter 14 and this will be equal to the voltage to which the condenser 4 is charged.

In order that the potential across the condenser may not be the charge resulting from the direct current supply, but may represent the average peak value of the potential in the circuit 1, 2, a high resistance shunt 15 is placed across the condenser allowing a small discharge of the condenser and requiring a corresponding recharge at each cycle. This keeps the condenser charged approximately to the average of the unidirectional maxima of the alternating current voltage. This resistance should be of such a value that the galvanometer will show a deflection when the leakage current is shifted from the condenser to the direct current supply. It should not be of such a low value, however, as to cause a perceptible drop in the main voltage across the condenser. In ordinary practice the reading of the voltmeter 14 secured by balancing the system so that the galvanometer shows no deflection is sufficiently accurate if the resistance 15 is between 10,000 and 100,000 ohms per volt of applied potential.

While it is possible to measure the voltage of the condenser directly by means of an electrostatic voltmeter, this method is not always convenient since such instruments are affected by the presence of external fields, mechanical vibrations, etc., and are not readily portable. It would also be possible to measure this voltage by means of a direct current instrument having a high enough resistance so that the energy consumed by it per cycle is negligible as compared with that stored by the condenser. Portable instruments having the high resistance required, however, are difficult to obtain.

The method which I have described has the advantage over the above mentioned methods of measuring the voltage in that both the voltmeter 14 and the galvanometer 13 may be of readily portable types.

The method of operation which I have described gives results which are sufficiently accurate for most purposes. It will, however, be apparent that the voltage of the condenser is equal to the maximum voltage of the alternating current wave less the drop through the kenotron due to the leakage current. This drop is so small that in most cases it will be negligible. To avoid this drop entirely, however, the direct current voltage must be raised to the point where the leakage current is supplied from the direct current source. Under this condition, if the direct current voltage is raised too high the condenser is charged from the direct current source and the charge is maintained thus giving a reading larger than the maximum of the alternating current wave. To obtain the highest degree of accuracy therefore, it will be necessary under these conditions to make two readings, first, the voltmeter reading when the galvanometer is at zero. From this reading the leakage current may be calculated from the known values of voltage and resistance, or, if additional leakage is suspected, by means of a galvanometer in series with the kenotron. A second reading may then be taken by adjusting the potentiometer so that the galvanometer gives a deflection just equal to the leakage current. The voltage across the condenser will then equal that indicated by the voltmeter less the drop through the galvanometer.

What I claim as new and desire to secure by Letters Patent of the United States, is,—

1. Means for measuring the maximum value of voltage in an electric circuit comprising a condenser connected to the circuit, a rectifier in series with said condenser, a source of direct current, means for obtaining from said source a potential equal to the potential across said condenser and means for measuring the potential thus obtained.

2. Means for measuring the maximum value of voltage in an electric circuit comprising a condenser connected to the circuit, a rectifier in series with said condenser, a separate source of direct current connected to said condenser, a galvanometer in series with said source, means for adjusting the potential of said separate source so that the galvanometer will give no deflection, means for measuring the potential of said source applied to the condenser, and a high ohmic resistance connected in shunt to said condenser.

3. Means for measuring the maximum value of voltage in an electric circuit comprising a condenser connected to the circuit, means for keeping said condenser charged to approximately the maximum potential of the circuit, a separate source of direct current connected to said condenser and means for adjusting the potential of said source applied to said condenser so that it equals the potential to which the condenser is charged from the circuit.

4. Means for measuring the maximum value of voltage in an electric circuit comprising a condenser connected to the circuit, means for keeping said condenser charged to approximately the maximum potential of the circuit, a separate source of direct current connected to said condenser, a galvanometer in series with said source, means for adjusting the potential of said source so that the galvanometer will give no deflection, and means for measuring the potential of said source.

5. The method of measuring the maximum value of a voltage wave which consists in first charging a condenser with the voltage to be measured, then balancing this voltage with a voltage derived from a separate source of direct current, and then measuring the voltage of the separate source required to balance the condenser voltage.

6. The method of measuring the maximum value of a voltage wave which consists in first charging a condenser with the voltage to be measured, then adjusting the potential of a separate source of direct current applied to the condenser so that a galvanometer in series with said source will show no deflection, and then measuring the potential of said source which is applied to the condenser.

In witness whereof, I have hereunto set my hand this 26th day of Feb., 1917.

MAX G. NEWMAN.